Aug. 15, 1933.   H. G. ALLEN ET AL   1,922,412
GLUING AND SEALING MACHINE FOR SHIPPING CASES
Original Filed July 8, 1929   2 Sheets-Sheet 1

INVENTORS
Howard G. Allen and
Frederick W. Kucklinsky BY
Stuart C. Barnes
ATTORNEY.

Aug. 15, 1933.　　H. G. ALLEN ET AL　　1,922,412
GLUING AND SEALING MACHINE FOR SHIPPING CASES
Original Filed July 8, 1929　　2 Sheets-Sheet 2
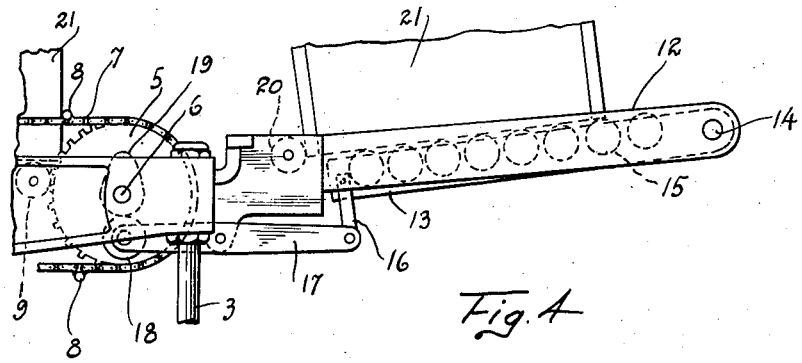
Fig. 4
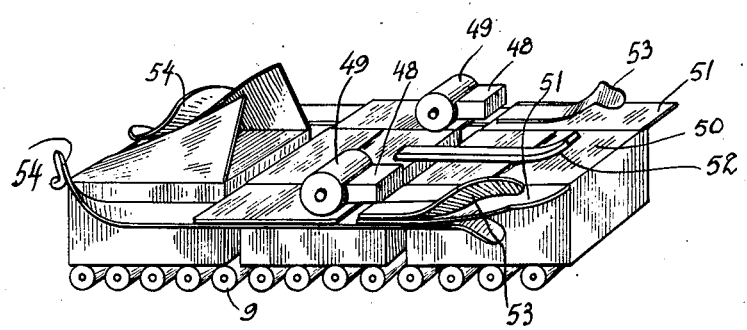
Fig. 5
Fig. 3
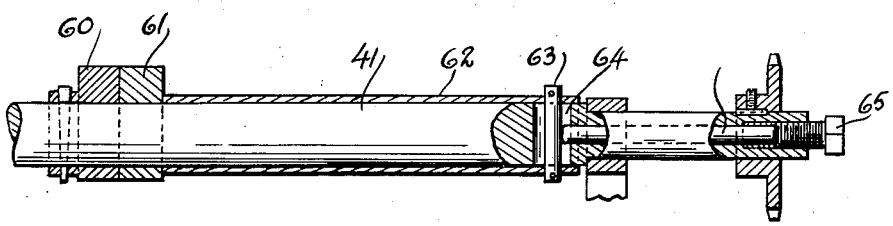
INVENTORS
Howard G. Allen and
Frederick W. Kucklinsky BY
ATTORNEY.

Patented Aug. 15, 1933

1,922,412

UNITED STATES PATENT OFFICE 1,922,412

GLUING AND SEALING MACHINE FOR SHIPPING CASES

Howard G. Allen, Niagara Falls, N. Y., and Frederick W. Kucklinsky, Montclair, N. J., assignors to H. R. Bliss Company, Inc., Niagara Falls, N. Y., a Corporation of New York Application July 8, 1929, Serial No. 376,521
Renewed January 16, 1933

10 Claims. (Cl. 93—2)

This invention relates to a gluing and sealing machine for shipping cases, and it is an object of the invention to provide such a machine of an automatic nature designed to glue and seal cases in one continuous operation.

The invention contemplates a machine which embodies two units, one of which is a gluing unit and the other of which is a sealing unit, through which the cases to be sealed are passed, with means for advancing or passing the cases through the units with proper relative speeds. A novel feed device or table is provided which acts to automatically feed the cases into the machine in properly spaced and timed relation, and provision is made for making the gluing mechanism operative and inoperative in accordance with the spacing of the cases.

In the accompanying drawings:

Fig. 3 is a detailed view partly in section showing the adjustable cam construction for controlling the silicating mechanism.

Fig. 4 is an enlarged detail of the feed table showing the table in the position it assumes prior to feeding the case into the machine.

Fig. 5 is a perspective view somewhat diagrammatically showing the manner in which the flaps of the shipping case are glued.

Figure 1:
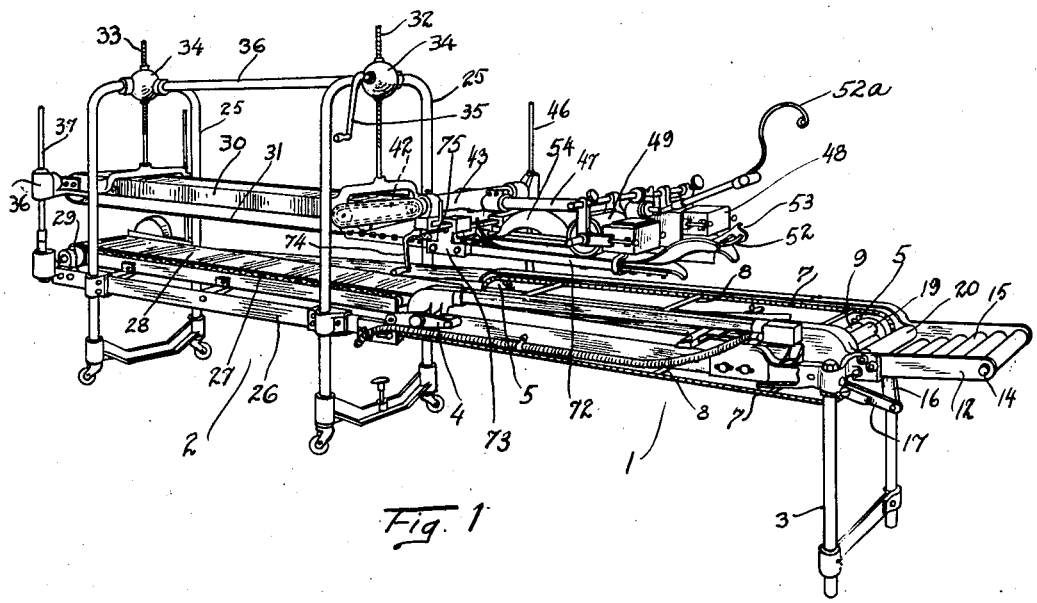
Fig. 1 is a perspective view of a complete, assembled machine.

The apparatus as shown in Fig. 1 consists of a gluing unit generally referenced 1, and a sealing unit generally referenced 2, both of which are constructed in a single machine. One end of the gluing unit has legs 3 supporting the same, whereas the other end of the gluing unit may advantageously be supported by a frame structure of the sealing unit, as by means of a bracket connection 4. Adjacent each end of the silicating unit are sprocket wheels 5, there being a pair of such sprocket wheels at each end mounted on the shafts 6 (Fig. 4), and over these sprocket wheels there are endless chains 7. At spaced intervals cross rods 8 are supported by the chains. The frame of the gluing unit includes a multiplicity of parallel rollers extending transversely across the frame for the purpose of conveying the shipping case through the machine, such rollers being as shown at 9 in Fig. 4.

The frame of the gluing unit, at the free receiving end, has projecting frame parts 12. A sub-frame 13 is pivoted as at 14 (Fig. 4) to the outer end of the frame portions 12, and this frame carries parallel rollers 15. The opposite end of the sub-frame is supported through a connection 16 by a rock arm 17. One end of the rock arm 17 carries a roller 18 which engages cam 19 carried on the shaft 6. The unit has a roller 20 positioned somewhat in advance of the secondary frame and the roller is carried thereby.

Shipping cases are placed on the secondary frame 13, and a case slides downwardly on rollers until the case engages the roller 20 in the position depicted by the shipping case at 21 (Fig. 4). The sprocket wheels 5 are rotated continuously during the operation of the machine by suitable means (not shown), and at timed intervals the cam 19 acts on the rock arm 17 to raise the sub-frame 13, thus to allow the shipping case to move along the rollers into the gluing unit, whereupon the case is engaged by one of the cross rods 8, as shown in Fig. 4, and is advanced through the unit.

The sealing unit includes upright frame members 25 with a bed frame 26 which supports a multiplicity of rollers 27 over which moves a belt 28, the belt travelling over the driven rollers 29 which are disposed adjacent the ends of the unit. The unit includes also an upper frame 30 also having a belt 31 which operates over rollers similar to the rollers 27. At least one set of these rollers is spring-pressed so that the case is engaged between the belts with pressure. This construction, however, is well known to those versed in the art and is not shown in detail here.

The upper frame 30 is supported by worm shafts 32 and 33. The frame includes housings 34 containing suitable gears (not shown) which engage the worm shafts. The upper frame may be raised and lowered for cases of various sizes by means of a handle 35 which actuate the gears to raise and lower the shafts. The gears in the housings may be actuated in unison by a suitable shaft connection extending through the top horizontal portion 36 of the sealing frame. The belts 28 and 31 are moved in timed relation to the movement of the chain 7. For this purpose the same means (not shown) for moving the chains may be used to move the belts. For the purpose of permitting shift of the upper frame 30, suitable gearing in the housing 36a is provided with a sliding connection in the shaft 37 which drives the end roller in the upper frame.

Figure 2:
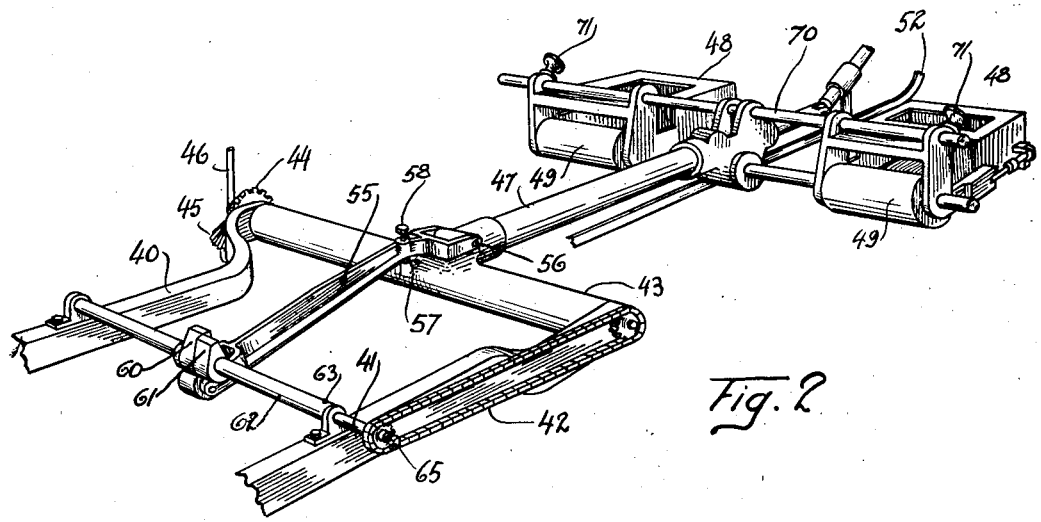
Fig. 2 is a perspective view in detail showing the mechanism for supporting the gluing mechanism, and for actuating on this mechanism to raise and lower the same, it being thus rendered inoperative or operative respectively.

The upper bed frame 30 supports a portion of the gluing mechanism as shown in Fig. 2. This upper bed has projecting frame portions 40 carrying a shaft 41 rotated by means of a chain 42 which in turn is moved by a shaft (not shown) extending transversely through a housing 43 carrying at one end a pinion 44. This pinion engages the pinion 45 which has a sliding connection with a driving shaft 46. A supporting arm 47 is carried by the housing 43 and projects outwardly so as to overlie the frame of the gluing unit. This supporting arm 47 carries, by means of a transverse rod 70, suitable pots or containers 48 for the glue. Rollers 49 cooperate with the containers to apply the glue to appropriate portions of the cases.

Cases which the machine is nicely adapted to glue and seal are those which include inner and outer flaps, as shown in Fig. 5. Here it will be seen that each case has inner flaps 50 and outer flaps 51. As the cases are moved through the machine the inner flaps are in folded position and are so retained by a suitable rod 52 under which the flaps pass so as to be held down thereby. The outer flaps are engaged by wings 53 so as to be folded outwardly and move under the gluing rollers, to thus apply the glue, and the outer flaps are then engaged by reversing wings 54 to fold the flaps over the inner flaps 50. A tucker 52a may be employed for folding the inner flaps. As shown in Fig. 1 it is in inoperative position; in operative position it is disposed so that its hooked portion engages and folds downwardly the inner flaps.

Inasmuch as the cases are moved through the machine in spaced relation, it is desirable to lift the silicating rollers so that the rollers are inoperative and do not apply the material at the point which is commonly termed the "skip gap". For this purpose the supporting arm 47 is held in position by a supporting member 55 (Fig. 2), pivoted to the arm 47 as at 56; the member 55 has a set screw 58 which makes contact at the point 57 with the housing 43 which is rigid with arm 47. These two points are disposed on opposite sides of the axis of the housing 43. The free end of the member 55 carries a roller which engages a cam construction on the shaft 41. In the operation of this arrangement the cam construction actuates to push the arm 55 downwardly, thus raising the supporting arm 47, and in turn raising the gluing mechanism into inoperative position. For the purpose of making adjustment, the set screw 58 may be turned.

It is desirable that the period of time that the silicating rollers are raised be adjustable for taking care of various sized cases. For this purpose the cam construction takes the form of double cams 60 and 61 (Fig. 3). One cam 60 may be pinned to the shaft 41 and the other cam 61 is adjustable with relation to the cam 60. The cam 61 may be loosely placed upon the shaft 41 and over the shaft may be placed a sleeve 62 provided with a pin 63 projecting through a suitable slot 64 in the shaft. A screw 65 which is screw threaded into the shaft engages the pin 63. To make an adjustment the screw 65 is loosened and the cam 61 turned in the desired position, whereupon the screw is tightened and the cam 61 is forced tightly against the cam 60 to maintain the set position. By this arrangement the high points of the cams can be varied to determine the total length of the high point provided by the two cams whereby the element of time can be varied.

In the operation of the machine, filled cases are placed upon the table 13, and at regular timed intervals the table is raised and the cases slide into the gluing unit. The cases are moved along by the chains and cross rods and the inner sides of the outer flaps are glued with the gluing mechanism raising at proper timed intervals. After the outer flaps are folded relatively over the inner flaps the cases, with continuous movement, pass into the sealing unit where they are engaged with pressure between the belts 28 and 31, and the cases, when finally sealed, move out of the sealing unit.

It will be noted that when it is desirable to seal cases of different sizes the machine can be readily adjusted by the turning of the handle 35, thus raising or lowering the frame 30. Inasmuch as the silicating rollers and other silicating mechanism, including the wings 53, and 54, are carried by the frame portions 40 of the upper frame 30, this single adjustment effects adjustment of both the gluing unit and sealing unit. The machine is adjustable also for cases of different widths. As shown in Fig. 2, the glue rollers and the containers are supported on a shaft 70 and may be moved in and out on the shaft and locked in any desirable position by set screws 71. Likewise, the wings 53 and 54 and other associated parts are carried by a frame construction 72, connected and supported in turn as at 73 by the bed frame 30. The connection 73 is slidable transversely, and this is accomplished by means of a suitable handle 74 for turning the worm 75 which engages the connecting members 73.

The entire machine is of an automatic gluing and sealing type wherein the cases are automatically fed into the machine in properly timed relation and moved through the machine with continuous movement and wherein single adjustment for case height effects the adjustment of both silicating and sealing units.

Moreover, the machine requires much less space, particularly as regards the width of the gluing unit than gluing machines heretofore employed. It has been the practice to provide a gluing unit with separate supporting devices at the sides of the frame which project out of the frame and which are for the purpose of supporting the wings, glue pots, and other associated structures. In the present machine, however, all gluing mechanism is supported from the frame of the sealing unit so that the gluing mechanism is substantially of the same width as the frame of the gluing unit.

We claim:

1. In combination, a gluing unit for shipping cases comprising a frame, a sealing unit comprising a frame, lower and upper pressure rollers in the frame of the sealing unit, carrying means for the upper pressure rollers, glue applying mechanism carried by the said carrying means and projecting over the frame of the gluing unit, and means for adjusting said carrying means for variation in shipping case size whereby the glue applying mechanism is also adjusted.

2. In combination, a gluing unit for shipping cases comprising a frame, a sealing unit comprising a frame, lower and upper pressure rollers in the frame of the sealing unit, carrying means for the upper pressure rollers, glue applying mechanism carried by the said carrying means and projecting over the frame of the gluing unit, means for adjusting said carrying frame for variation in shipping case size whereby the glue applying mechanism is also adjusted, and means for adjusting the glue applying mechanism relative to the carrying frame.

3. In combination, a gluing unit for shipping cases comprising a frame, a sealing unit comprising a frame, lower and upper pressure rollers in the frame of the sealing unit, carrying means for the upper pressure rollers, glue applying mechanism carried by the said carrying means and projecting over the frame of the gluing unit, means for adjusting said carrying frame for variation in shipping case size whereby the glue applying mechanism is also adjusted, and means for adjusting the glue applying mechanism perpendicularly to the adjustment of said carrying frame.

4. In combination, a gluing unit for shipping cases comprising a frame, a sealing unit comprising a frame, lower and upper pressure rollers in the frame of the sealing unit, carrying means for the upper pressure rollers, glue applying mechanism carried by the said carrying means and projecting over the frame of the gluing unit, means for adjusting said carrying frame for variation in shipping case size whereby the glue applying mechanism is also adjusted, means for adjusting the glue applying mechanism relative to its carrying frame but in the same plane of adjustment, and means for adjusting the glue applying mechanism perpendicularly to the adjustment of said carrying frame.

5. In combination, a frame for supporting shipping cases or the like, a second frame, means securing the frames together, pressure means on said second frame, a supporting arm pivoted to said second frame and projecting above the first named frame, glue applying devices carried by this supporting arm, a second supporting arm pivoted to the first, means for holding the second arm in position whereby to hold the first supporting arm in projecting position, and a set screw cooperating with the two arms or effecting adjustment between them.

6. In combination, a frame for supporting shipping cases or the like, a second frame, means securing the frames together, pressure means on said second frame, a supporting arm pivoted to said second frame and projecting above the first named frame, glue applying devices carried by this supporting arm, a second supporting arm pivoted to the first, means for holding the second arm in position whereby to hold the first supporting arm in projecting position, an adjustable means cooperating with the two arms for effecting adjustment between said two arms.

7. A shipping case sealing mechanism comprising in combination, a sealing unit, a gluing unit, a pivoted arm carried by the sealing unit and projecting over the gluing unit, glue applying mechanism carried by this arm, cam means for rocking the supporting arm and gluing mechanism, said pivotal mounting including a housing, a drive shaft in this housing, and means connecting the drive shaft and cam.

8. In a gluing and sealing machine for shipping cases or the like, a supporting structure having means for moving shipping cases therethrough, a pivoted glue applying device positioned above the support, and cam means for rocking the glue applying device whereby the same is raised in spaces between shipping cases, said cam means including two cam devices adjustable relative to each other whereby the active cam face may be varied.

9. In a gluing and sealing mechanism for shipping cases or the like, a support along which shipping cases are adapted to be moved, a pivoted glue applying device positioned above the support, a driven shaft, a cam fixed to the shaft to move therewith, a cooperating cam rotatable on said shaft whereby the cams may be adjusted relative to each other, means for securing the cams together in an adjusted position, and means associated with the pivoted glue applying device upon which said cams act to rock said gluing device.

10. In a gluing and sealing mechanism for shipping cases or the like, a support along which shipping cases are adapted to be moved, a pivoted glue applying device positioned above the support, a driven shaft, a cam fixed to the shaft to move therewith, a cooperating cam loose on said shaft whereby the cams can be adjusted relative to each other, means for securing the cams together in an adjusted position, means associated with the pivoted glue applying device upon which said cams act to rock said gluing device, said locking means for the cam comprising a sleeve on said shaft and locked to rotate therewith, and means for clamping said sleeve up against the loose cam.

HOWARD G. ALLEN.
FREDERICK W. KUCKLINSKY.